Figures 1, 2, 3, 4:
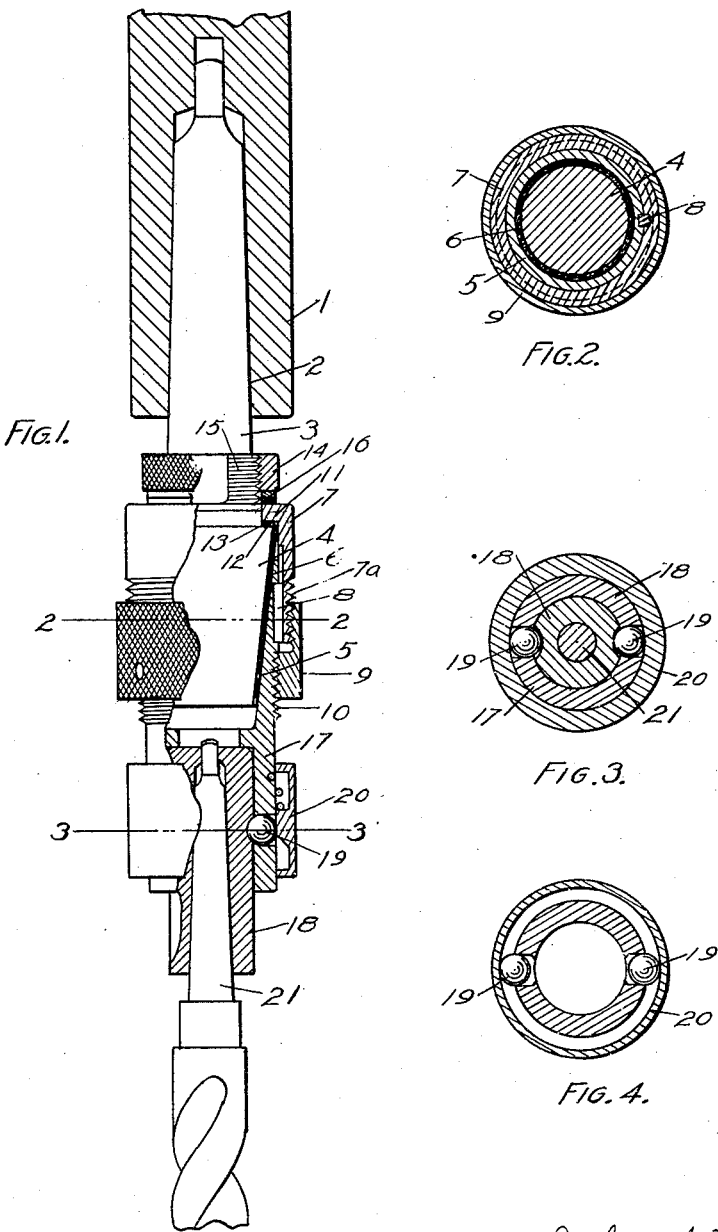

Dec. 8, 1931.  J. W. McKEAN  1,835,168

SLIP DRIVING DEVICE

Filed Feb. 27, 1929

John W. McKean
INVENTOR.

BY
ATTORNEYS.

Patented Dec. 8, 1931

1,835,168

UNITED STATES PATENT OFFICE

JOHN W. McKEAN, OF ERIE, PENNSYLVANIA, ASSIGNOR TO TITAN TOOL COMPANY, OF ERIE, PENNSYLVANIA, A CORPORATION OF PENNSYLVANIA

SLIP DRIVING DEVICE

Application filed February 27, 1929. Serial No. 342,988.

This invention is designed to improve slip driving devices. The present invention is designed to simplify the construction of slip driving devices, both as to initial manufacture and subsequent use. The invention is also advantageous in that it reduces the space necessary to accomplish the purpose in a rugged and simple manner. Features and details of the invention will appear from the specification and claims.

A preferred embodiment of the invention is illustrated in the accompanying drawings as follows:—

Fig. 1 shows an elevation of the device, partly in section.

Fig. 2 a section on the line 2—2 in Fig. 1.

Fig. 3 a section on the line 3—3 in Fig. 1.

Fig. 4 a section on the line 3—3 showing the locking ring in release position.

1 marks the driving spindle. This is provided with a shank-receiving socket 2. The slip driving device is provided with a shank 3 which fits into the driving socket 2. A conical driving member 4 is formed integrally with the shank 3 and a conical driving sleeve 5 operates on the driving member 4, the conical surfaces of these members conforming to each other and friction material 6 is arranged between them. A sleeve 7 extends over the member 5 and is locked therewith by a spline 8. It is provided with an exterior screw thread 7a and a nut 9 operates on this screw thread and also on a screw thread 10 on the conical member 5. The pitch of the screw threads 7a and 10 differ so that a very fine adjustment of the distances between the conical members may be had.

The sleeve 7 has an inwardly extending flange 11 which operates against a shoulder 12 between the shank 3 and the conical member 4. A wearing washer 13 is provided between the flange and the shoulder. A nut 14 is mounted on screw threads 15 on the shank 3 and forms a locking shoulder above the flange 11, wear washers 16 being provided between the nut 14 and the flange. It will thus be seen that the sleeve 7 is locked against axial movement between the shoulder 12 and nut 15 but is free to rotate relatively to the driving conical member 4. It will be noted that it is locked against rotation relatively to the outer conical member 5 but is free to move axially relatively thereto to permit the adjustment of the member 5 on the conical member.

The outer member 5 has a sleeve extension 17 which is adapted to receive the ordinary collet 18, this collet being locked by balls 19 operating in connection with a locking ring 20 in the well-known manner. A drill 21 is indicated as mounted in the collet.

With this structure it will be noted that the adjusting mechanism for the friction driving device is arranged directly over the driving devices and consequently permits of a very short mechanism with a comparatively long driving surface. All parts of the adjustable mechanism are of easy access where it may be readily observed and the number of parts is reduced to a minimum and the parts are of such form as to lend themselves readily to fabrication.

What I claim as new is:—

1. In a slip driving device, the combination of two conical members, one within the other; adjusting means for the members comprising a sleeve locked axially with the inner and rotatively with the outer member; and a screw-threaded connection between the sleeve and outer member adjusting the frictional engagement of the members, said connection including a nut interposed between the sleeve and outer member and connected to the sleeve and outer member by screw threads of different pitches.

2. In a slip driving device, the combination of two conical members, one within the other; a shank extending integrally from the inner member providing a shoulder between the shank and the inner member; a sleeve extending from the outer member and having an inwardly extending flange engaging said shoulder; means for locking the outer surface of the sleeve axially with the shank while permitting its rotation relatively thereto; a spline connection between the sleeve and the outer member; and a nut having a screw-threaded connection with the sleeve and outer member.

3. In a slip driving device, the combination of two conical members, one within the other;

a shank extending integrally from the inner member providing a shoulder between the shank and the inner member; a sleeve extending from the outer member and having an inwardly extending flange engaging said shoulder; means for locking the outer surface of the sleeve axially with the shank while permitting its rotation relatively thereto; a spline connection between the sleeve and the outer member; and a nut having a screw-threaded connection with the sleeve and outer member, the threaded connection with the sleeve having a different pitch than the threaded connection with the outer member.

4. In a slip driving device, the combination of an inner member having an upwardly extending shank, a downwardly extending conical portion and a screw-thread on the lower end of the shank; an outer member arranged on the inner member and having a corresponding conical surface; work-carrying means on the lower end of the outer member; a sleeve having an inturned flange engaging the upper end of the conical portion of the inner member; a nut arranged on the screw threads of the shank above the inturned flange; means locking the sleeve and outer member rotatively together; and a nut adjusting the sleeve and outer member relatively to each other.

In testimony whereof I have hereunto set my hand.

JOHN W. McKEAN.